United States Patent [19]

Kalkunte et al.

[11] Patent Number: 5,515,523
[45] Date of Patent: May 7, 1996

[54] METHOD AND APPARATUS FOR ARBITRATING CONFLICTS BY MONITORING NUMBER OF ACCESS REQUESTS PER UNIT OF TIME IN MULTIPORT MEMORY SYSTEMS

[75] Inventors: Ramsesh Kalkunte, Acton; Satish Rege, Groton, both of Mass.; Ronald Edgar, Raymond, N.H.

[73] Assignee: Digital Equipment Corporation, Maynard, Mass.

[21] Appl. No.: 288,640

[22] Filed: Aug. 10, 1994

Related U.S. Application Data

[63] Continuation of Ser. No. 709,559, Jun. 3, 1991, abandoned.

[51] Int. Cl.⁶ .............................. G06F 12/00; G06F 13/14
[52] U.S. Cl. .................................. 395/476; 364/DIG. 1; 364/DIG. 2; 364/244.8; 395/308; 395/728; 395/307
[58] Field of Search ........................... 364/200 MS File, 364/900 MS File; 395/425, 476–478, 287, 308, 311, 728, 307

[56] References Cited

U.S. PATENT DOCUMENTS

| | | | |
|---|---|---|---|
| 3,740,722 | 6/1973 | Greenberg et al. | 395/425 |
| 4,096,569 | 6/1978 | Barlow | 395/325 |
| 4,374,414 | 2/1983 | Comport et al. | 395/725 |
| 4,438,489 | 3/1984 | Heinrich et al. | 395/325 |
| 4,449,183 | 5/1984 | Flahive et al. | 395/425 |
| 4,547,850 | 10/1985 | Genma | 395/200 |
| 4,620,278 | 10/1986 | Ellsworth et al. | 395/325 |
| 4,621,342 | 11/1986 | Capizzi et al. | 395/325 |
| 4,652,993 | 3/1987 | Scheuneman et al. | 395/425 |
| 4,835,672 | 3/1989 | Zenk et al. | 395/425 |
| 4,837,682 | 6/1989 | Culler | 395/325 |
| 5,027,317 | 6/1991 | Pepera et al. | 395/375 |
| 5,067,071 | 11/1991 | Schanin et al. | 395/275 |
| 5,073,871 | 12/1991 | Uchida et al. | 395/425 |
| 5,109,495 | 4/1992 | Fite et al. | 395/375 |
| 5,117,350 | 5/1992 | Parrish et al. | 395/425 |
| 5,168,547 | 12/1992 | Miller et al. | 395/325 |
| 5,197,130 | 3/1993 | Chen et al. | 395/325 |
| 5,210,870 | 5/1993 | Baum et al. | 395/600 |

*Primary Examiner*—Matthew M. Kim
*Attorney, Agent, or Firm*—Arthur W. Fisher; Denis G. Maloney; Joanne N. Pappas

[57] ABSTRACT

A method for arbitrating conflicting requests for a memory transfer in a multiport memory system including first and second memory ports. The method includes the following steps. First, monitoring the volume of memory transfer requests from the first memory port. Second, partially disabling the second memory port if the memory request volume is greater than a first predetermined volume. And third, reenabling the second memory port when the memory request volume becomes less than a second predetermined volume. Apparatus implementing this method which includes an activity detector, coupled to the first memory port, for generating a bistate signal having a first state when the volume of memory requests by the first memory port exceeds a first predetermined volume and a second state otherwise. Circuits are provided for selectively partially disabling memory requests from the second memory port in response to the bistate signal being in the second state.

33 Claims, 7 Drawing Sheets a
METHOD AND APPARATUS FOR ARBITRATING CONFLICTS BY MONITORING NUMBER OF ACCESS REQUESTS PER UNIT OF TIME IN MULTIPORT MEMORY SYSTEMS

This application is a continuation of U.S. Pat. No. application Ser. No. 07/790,55, filed Jun. 3, 1991, now abandoned.

The present invention is related generally to memories employed by data processing systems for storing information, and more particularly to arbitrating conflicts in memory controllers for use in multiport memory systems.

Multiport memory systems are memory systems which can respond to requests from a plurality of different utilization devices. Multiport memory systems include a common bank of memory locations which are accessible by two or more memory ports. Accesses from different memory ports are asynchronous and independent. Each port appears to have a dedicated memory coupled to it.

Multiport memory systems may be constructed, in a known manner, of a memory circuit and a controller which grants access to the memory circuit via one of the memory ports. Because the memory requests at the different memory ports are asynchronous, conflicting (i.e. simultaneous) requests are possible. The memory controller includes a memory access arbiter to arbitrate between conflicting requests. There are several known arbitration strategies. For example, memory accesses may be granted on a round-robin basis, or according to a priority scheme. When a particular memory port is granted access to the memory circuit, it is coupled directly to the memory circuit, and the other memory ports are left uncoupled.

One use for such multiport memories is in computer networks, such as packet switch networks, in which all computers on the network are assigned unique addresses. Each computer in the network includes a network interface which transmits data to and receives data from the network. In the transmit mode of operation, the network interface accumulates in a memory a block of data from the computer, adds a destination address (among other data items) and transmits the resulting packet as a unit over the network. In the receive mode of operation, the network interface receives a packet from the network, stores it in memory, and extracts the block of data, and supplies the data to the computer. Multiport memory systems are used to perform this temporary storage and retrieval of the packet data. One port of the memory system is coupled to the host computer and another port is coupled to the network interface. Other ports may be coupled to data processing circuitry local to the network interface which may need memory access.

It is important that packets from the network bound for a particular computer not be missed by that computer. For example, information packets may contain data about the current configuration of the network itself. If such a packet is missed, then that computer will be unable to correctly communicate over the network. In addition, missing one packet (due to lack of memory bus bandwidth) may cause the network interface to enter a diagnostic mode of operation. While the network interface is in a diagnostic mode of operation, subsequent packets may be missed, further compounding the problems. Thus, missing one packet has far-reaching deleterious effects. A packet will be missed if the memory circuit does not have sufficient bus bandwidth to respond both to memory requests from the network interface and the computer.

As long as the volume of memory requests, that is, the number of memory requests per unit of time, from the network interface is relatively low, then the memory system can properly process all of the memory requests. However, if the volume of memory requests is relatively high, then the memory system may have insufficient bus bandwidth to properly process all of the memory requests, and a packet from the network interface may be missed.

One way of minimizing the possibility of any loss of packet data from the network is to give the memory port coupled to the network interface higher priority than the port coupled to the host computer. This is only effective, however, if the bus bandwidth of the memory is sufficient to handle the combined data rates of the ports coupled to the memory. If the memory bus bandwidth is insufficient to handle the combined rates of the data at all the memory ports, even this will not prevent data loss.

Another way of minimizing the possibility of any loss of packet data is to increase the bus bandwidth of the memory circuit in the multiport memory system. This may be done by either increasing speed of the memory circuits themselves or by increasing the width of the memory circuit bus. Both increase the cost of the multiport memory system: the first because of the higher performance characteristics of the memory circuits; the second because of the increased pin-out requirements of the wider memory bus.

It is desirable that a multiport memory system provide enough memory bandwidth to eliminate loss of packet data from the network without requiring either high performance memory circuits or wider memory buses, either one of which will increase the costs of such a multiport memory system.

SUMMARY OF THE INVENTION

In accordance with principles of the present invention, there is provided a method for arbitrating conflicting requests for a memory transfer in a multiport memory system including first and second memory ports including the following steps. First is the step of monitoring the volume of memory transfer requests from the first memory port. Second is the step of partially disabling the second memory port if the memory request volume is greater than a first predetermined volume. And third is the step of reenabling the second memory port when the memory request volume becomes less than a second predetermined volume.

Apparatus in accordance with principles of the present invention includes an activity detector, coupled to the first memory port, for generating a bistate signal having a first state when the volume of memory requests by the first memory port exceeds a first predetermined volume and a second state otherwise. Means are provided for selectively partially disabling memory requests from the second memory port in response to the bistate signal being in the second state.

A memory controller in accordance with the present invention minimizes the possibility of loss of data from the monitored memory port in the event of high memory request traffic, maximizes efficient use of the memory component and minimizes starvation of other memory ports, without requiring higher performance memory components or wider memory bus widths.

DESCRIPTION OF THE PREFERRED EMBODIMENT

Figure 1:
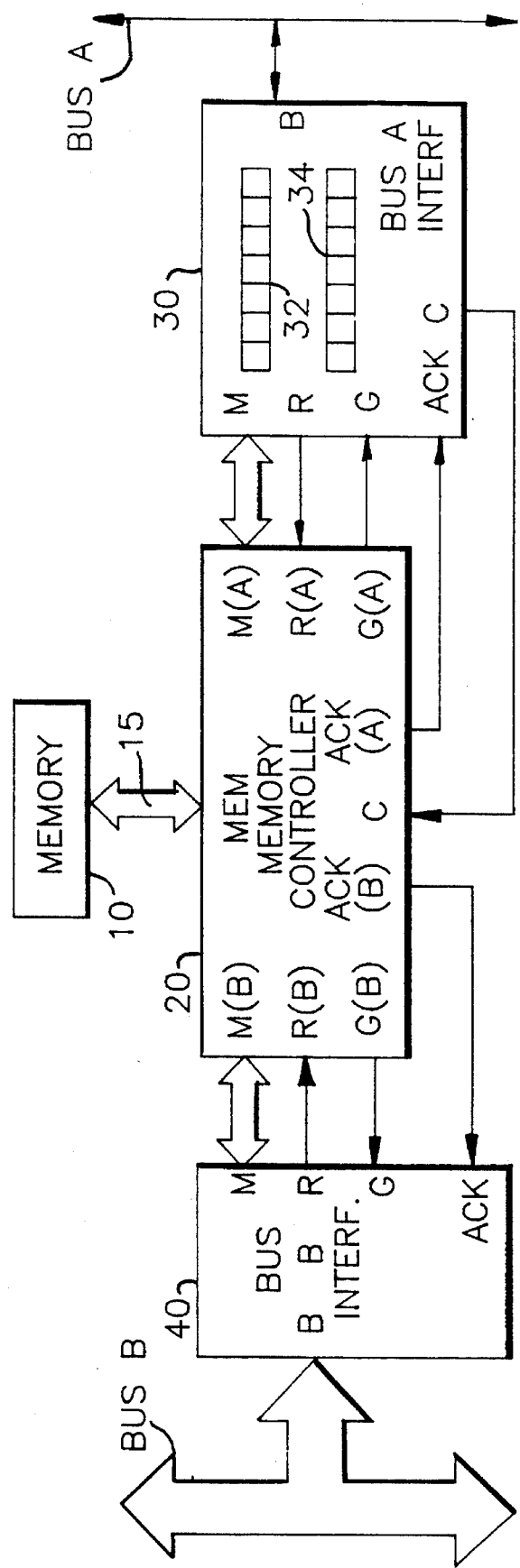
FIG. 1 is a block diagram of a network interface, for coupling a network communications bus to a host computer bus, and including a memory controller in accordance with principles of the present invention.

In the Drawing, wide lines represent multibit digital data signal paths, and narrow lines represent single bit digital control signal paths or clock signal paths. In order to minimize confusion, the embodiment of a multiport memory system illustrated in the drawing includes only two memory ports. One skilled in the art of memory system design will understand that a multiport memory system may have more than two ports, and will understand how to construct such a multiport memory system.

FIG. 1 is a block diagram of a network interface for coupling a network communications bus (BUS A) to a host computer bus (BUS B). In FIG. 1 a memory 10 is coupled to a memory interface terminal MEM of a memory controller 20 via a memory bus 15. The memory bus 15 includes address, data and control lines. Such memory buses are well known in the art and will not be described in detail here.

A first memory port M(A) of memory controller 20 is coupled to a memory interface terminal M of an interface 30 to the network communications bus (BUS A). A first grant output terminal G(A) of memory controller 20 is coupled to a grant input terminal G of bus A interface 30 and a first acknowledge output terminal ACK(A) of memory controller 20 is coupled to an acknowledge input terminal ACK of bus A interface 30. A request output terminal R of bus A interface 30 is coupled to a first request input terminal R(A) of memory controller 20 and a clock output terminal C of bus A interface 30 is coupled to a clock input terminal C of memory controller 20. A bus interface terminal B of bus A interface 30 is coupled to the network communications bus (BUS A). Bus A interface 30 includes a first FIFO buffer 32, containing 256 bytes of storage in the illustrated embodiment, for buffering data being received from the communications bus (BUS A), and a second FIFO buffer 34, containing 96 bytes of storage in the illustrated embodiment, for buffering data being transmitted to the communications bus (BUS A).

A second memory port M(B) of memory controller 20 is coupled to a memory interface terminal M of an interface 40 to the bus (BUS B) of the host computer (not shown). A second grant output terminal G(B) of memory controller 20 is coupled to a grant input terminal G of bus B interface 40 and a second acknowledge output terminal ACK(B) of memory controller 20 is coupled to an acknowledge input terminal ACK of bus B interface 40. A request output terminal R of bus B interface 40 is coupled to a second request input terminal R(B) of memory controller 20. A bus interface terminal B of bus B interface 40 is coupled to the host computer bus (BUS B).

In operation, bus A interface 30 monitors the communications traffic on bus A. When a packet on bus A is addressed to the host computer, the stream of data representing that packet is transferred to memory 10 under the control of bus A interface 30. FIFO 32 provides up to 256 bytes of buffering of this stream of data as it is transferred from the network communications bus (BUS A) to the memory 10. The data is temporarily stored in memory 10 and is subsequently retrieved and placed on the host computer bus (BUS B) under the control of bus B interface 40.

When a packet is to be transmitted by the host computer, the data to be placed in the packet is transferred from the host computer bus (BUS B) to the memory 10 under the control of bus B interface 40. When the network communications bus (BUS A) is ready to accept the packet, it is then transferred from its temporary storage location in memory 10 to the network communications bus (BUS A). FIFO 34 provides up to 96 bytes of buffering between memory 10 and the network communications bus (BUS A). The data in FIFO 34 is then placed on the network communications bus (BUS A).

Allocating memory blocks to store particular packets, record keeping of where each packet and memory block are coming from and going to, notifying the host computer that a packet has been received and the network communications bus (BUS A) interface 30 that a packet is to be transmitted and synchronizing the operations are well known processes and will not be described here.

These memory transfers are performed in a known manner. To transfer information between the memory 10 and the bus A interface 30, bus A interface asserts a request signal on its request output terminal R. In response to the request signal, memory controller 20 will assert a grant signal on the first grant output terminal G(A) when bus A interface 30 is allowed access to the memory 10. In response to the grant signal, bus A interface 30 performs a transfer of the desired data with memory 10 via its memory interface terminal M and memory bus 15. The transfer may be in either direction (under the control of the bus A interface). In the illustrated embodiment, a single memory exchange may include 32 bits of data, and up to 8 successive such exchanges may be allowed in each transfer.

During the data transfer, the memory controller 20 asserts an acknowledge signal on the acknowledge terminal ACK(A) to indicate that, in the case of a memory write operation, the memory controller 20 is ready to accept the data from bus A interface 30, and in the case of a memory read operation, memory controller 20 is ready to transfer the data to bus A interface 30. When the data transfer is complete, the acknowledge signal is deasserted, and the memory controller is in condition to accept the next request.

Transfers of data to and from the host computer bus (BUS B) are performed in a similar manner as described above. A request signal is asserted on request output terminal R of the bus B interface 40. In response to the request signal, memory controller 20 asserts a grant signal on the second grant output terminal G(B). The data is then transferred with memory 10 via its memory interface terminal M and the memory bus 15 when the data acknowledge signal is asserted by the memory controller 20. When the transfer is complete, the acknowledge signal is deasserted, and the memory controller 20 is in condition to accept the next request.

In order to maintain synchronicity with the communications traffic on bus A, bus A interface 30 generates a clock signal in synchronism with the data on bus A at its clock output terminal C. This clock signal is used by the memory controller 20 as its clock signal. Similarly, in order to maintain synchronicity with the host computer bus (BUS B)

bus B interface 40 generates a clock signal, internally, which is in synchronism with the data on the host computer bus (BUS B). In order to provide for the orderly flow of data from the bus B interface 40 and the memory controller 20, which are operating asynchronously, bus B interface is coupled to memory controller 20 through a synchronizer of known design. One skilled in the art will understand how to design and build such a synchronizer.

Figure 2:
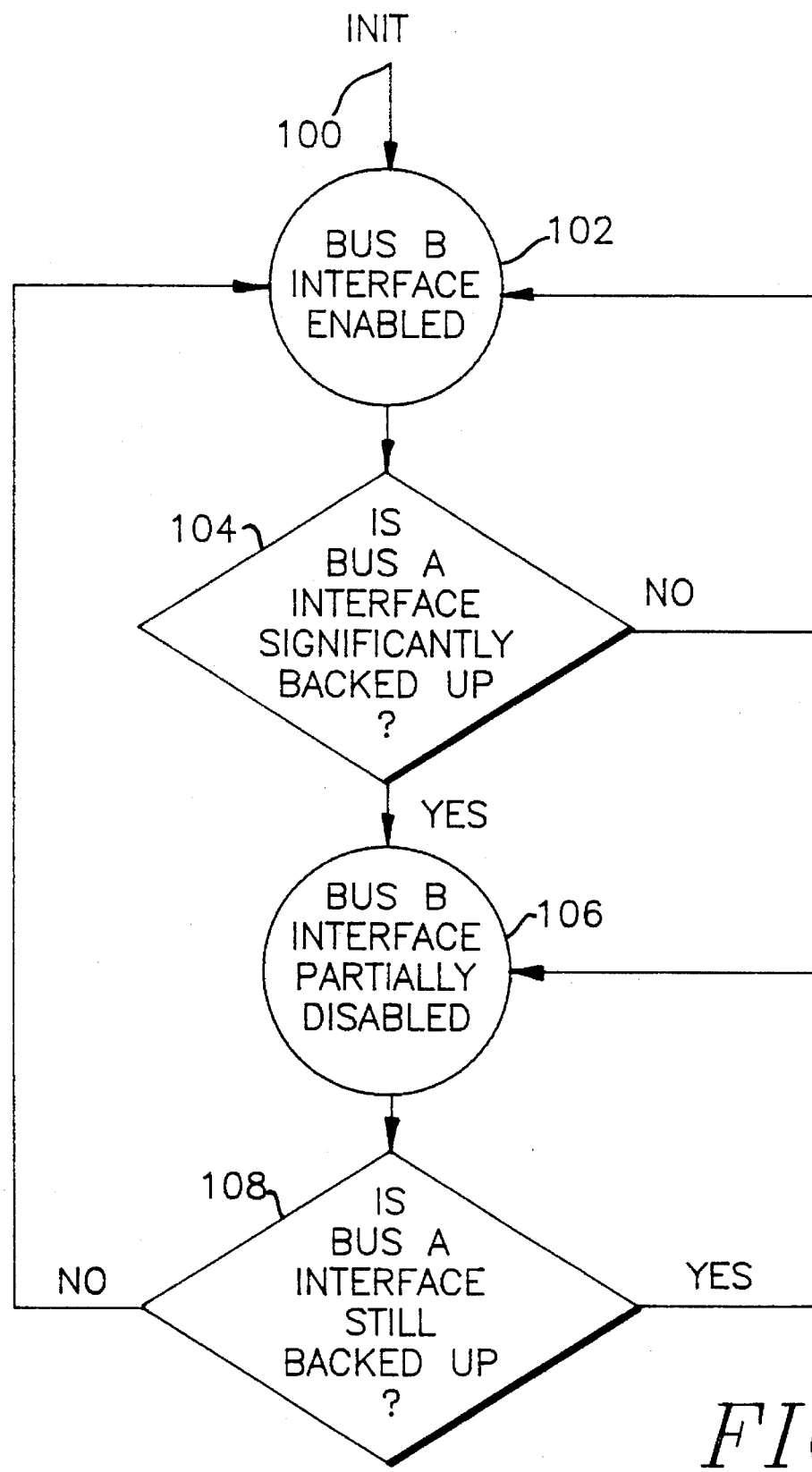
FIG. 2 is a flow chart illustrating a method of arbitrating among conflicting requests in accordance with principles of the present invention.

The operation of memory controller 20 may be better understood with reference to FIG. 2, which is a flow chart illustrating the method of resolving conflicting memory requests implemented by memory controller 20.

Referring to FIG. 2, when the memory controller is initialized 100 (such as at power turn-on), the normal operating state 102 is entered. In the normal operating state 102, memory controller 20 (of FIG. 1) grants memory requests as they are received. In the case of conflicting (i.e. simultaneous) memory access requests, requests from bus A interface 30 are given priority.

Under conditions of high traffic on both bus A and bus B, the memory bus 15 (of FIG. 1) may have too small a bus bandwidth and, thus, be unable to provide all the services requested. In the illustrated embodiment, the network communications bus (BUS A) is capable of transferring data at a rate of 200 megabits per second (Mbps). In addition, there are conditions under which data is being both transferred from bus A interface 30 to memory 10 and from memory 10 to bus A interface 30 over memory bus 15. (This can happen when immediately after a packet has been received from network communications bus (BUS A), a packet is transmitted to network communications bus (BUS A)). Under these conditions, the rate of data transfer through the memory interface port M of bus A interface 30 is 400 Mbps. In addition, the host computer bus (BUS B) is capable of transferring data at a rate of 400 Mbps. If both the host computer bus (BUS B) and the network communications bus (BUS A) are transferring data at their maximum rates, the combined data rate will be 800 Mbps. The maximum data rate at which the memory bus 15 can operate, however, is only 400 Mbps. Under these conditions, the memory is unable to service all the requests it receives.

One skilled in the art of network interface design will also understand that if dynamic memories are used for memory 10, then refresh cycles will also require some of the bandwidth of memory bus 15. In addition, if some of the data relating to allocation of memory blocks to packets and record-keeping as to which blocks are to be transferred to which bus are also stored in memory 10, then some memory bus 15 bandwidth must also be given over to that task as well. Finally, the network interface may provide some local intelligence, in the form of a processor, which requires access to the memory 10. This task also requires memory bus bandwidth, further decreasing the amount of memory bus bandwidth available to bus A interface 30 and bus B interface 40.

Under conditions where both bus A interface 30 and bus B interface 40 (of FIG. 1) request data transfers at their respective maximum data rates, then data on the network communications bus (BUS A) will be lost. (The loss of data on the host computer bus (BUS B) is not likely because the host computer can monitor the requested transfers and wait until they are completed before proceeding.)

As discussed above, the loss of network data may be minimized by increasing the bus bandwidth of memory 10, either by increasing the speed of the memory or by making the bus wider. For the exemplary embodiment, the memory bus bandwidth must be increased to 800 Mbps (plus any other bandwidth required by refresh, recordkeeping, and local intelligence).

Instead, referring again to FIG. 2, memory controller 20 monitors (at 104) the memory transfers requested by bus A interface 30. If the volume of requests indicates that the FIFOs contained in bus A interface 30 may be significantly backed up, then memory controller 20 partially disables the memory transfers with bus B interface 40 (106). When bus B interface 40 is partially disabled (106), a predetermined number of requests from bus A interface 30 will be granted before one request (if pending) from bus B interface 40 will granted.

While the bus B interface 40 is partially disabled, the volume of requests from bus A interface 30 is still monitored (108). When the volume of requests indicates that the FIFOs contained in bus A interface 30 are no longer backed up, then memory controller 20 reenables normal memory transfers with bus B interface 40 (102), otherwise bus B interface 40 remains partially disabled (106). This prevents FIFO 32 in bus A interface 30 from overflowing (losing received data), and prevents FIFO 34 from underflowing (not having data when required by BUS A), without requiring a higher speed memory or a wider memory bus.

Figure 3:
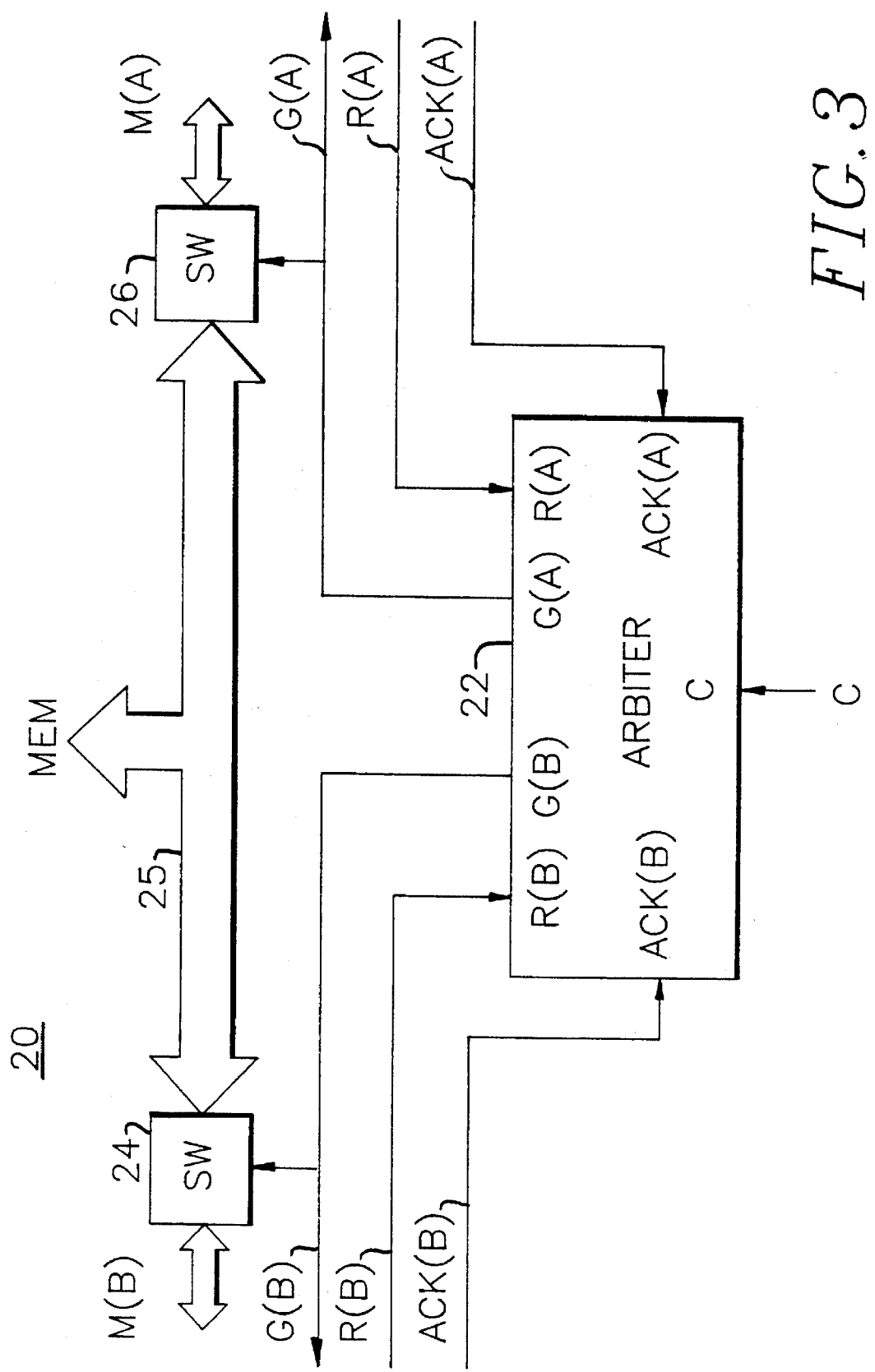
FIG. 3 is a block diagram of a portion of the memory controller illustrated in FIG. 1.

FIG. 3 is a block diagram of a portion of memory controller 20 illustrated in FIG. 1. In FIG. 3, elements which correspond to those illustrated in FIG. 1 are designated with the same reference number and are not described in detail.

In FIG. 3, a memory bus 25 is coupled to memory interface terminal MEM. Memory bus 25 is also coupled to respective first data terminals of switches 24 and 26. A second data terminal of switch 26 is coupled to the first memory port M(A). A second data terminal of switch 24 is coupled to the second memory port M(B).

The first request input terminal R(A) of memory controller 20 (of FIG. 1) is coupled to a first request input terminal R(A) of an arbiter 22. In addition, the first acknowledge output terminal ACK(A) of memory controller 20 (not shown in FIG. 3) is coupled internally to a first acknowledge input terminal ACK(A) of arbiter 22. A first grant output terminal G(A) of arbiter 22 is coupled to a control input terminal of switch 26 and the first grant output terminal G(A) of memory controller 20. The second request input terminal R(B) of memory controller 20 is coupled to a second request input terminal R(B) of arbiter 22. The second acknowledge output output terminal ACK(B) of memory controller 20 (not shown) is coupled internally to a second acknowledge input terminal ACK(B) of arbiter 22. A second grant output terminal G(B) of arbiter 22 is coupled to a control input terminal of switch 24 and to the second grant output terminal of memory controller 20. Clock input terminal C of memory controller 20 is coupled to a clock input terminal C of arbiter 22.

In operation, the portion of memory controller 20 illustrated in FIG. 3 controls access to the memory bus 25 by the bus A interface 30 (of FIG. 1) and the bus B interface 40 (of FIG. 1). Arbiter 22 receives request signals from bus A interface 30 (R(A)) and from bus B interface 40 (R(B)). If a request from bus A interface 30 is granted, then a grant signal is asserted on grant output terminal G(A) of arbiter 22. This signal is supplied to bus A interface 30 and at the same time conditions switch 26 to couple the first memory port M(A) to the memory bus 25. Bus A interface 30 is now coupled to memory bus 25 and controls memory 10 (of FIG. 1).

Similarly, if a request from bus B interface 40 is granted, the grant signal asserted on grant output terminal G(B) of arbiter 22 is supplied to bus B interface 40 and conditions switch 24 to couple the memory port M(B) to the memory bus 25, enabling bus B interface 40 to control memory 10. At most, only one switch is conditioned to couple its memory port M to the memory bus 25.

Under normal operations (block 102 of FIG. 2), bus A interface 30 and bus B interface 40 are granted access to memory 10 (of FIG. 1) according to the priority given to the bus A interface 30. Arbiter 22 monitors the volume of requests from bus A interface 30 (block 104 of FIG. 2), and when the volume indicates that the FIFOs in bus A interface 30 are significantly backed up, will partially disable requests from bus B interface 40 (block 106 of FIG. 2). While requests from bus B interface 40 are partially disabled, arbiter 22 continues to monitor the volume of requests from bus A interface (block 108 of FIG. 2) and will return to normal operation (block 102 of FIG. 2) when the volume of requests indicates that the FIFOs are no longer significantly backed up.

Figure 4:
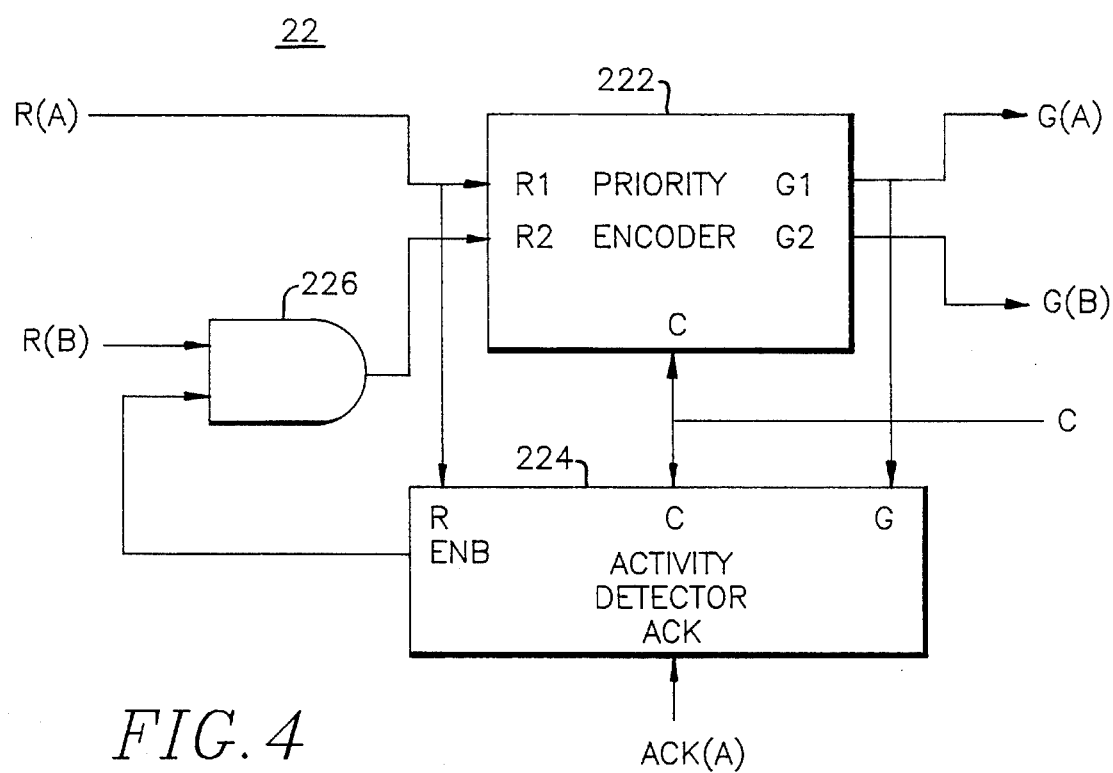
FIG. 4 is a block diagram of a portion of an arbiter in the memory controller illustrated in FIG. 3.

FIG. 4 is a block diagram of a portion of arbiter 22 illustrated in FIG. 3. In FIG. 4, elements similar to those illustrated in FIG. 3 are designated with the same reference numbers and are not discussed in detail. In FIG. 4, request input terminal R(A) of arbiter 22 is coupled to a first input terminal R1 of priority encoder 222 and a first input terminal R of activity detector 224. A first output terminal G1 of priority encoder 222 is coupled to grant output terminal G(A) of arbiter 22. Request input terminal R(B) is coupled to a first input terminal of a two input AND gate 226. An output terminal of AND gate 226 is coupled to a second input terminal R2 of priority encoder 222. A second output terminal G2 of priority encoder 222 is coupled to grant output terminal G(B) of arbiter 22. An enable output terminal ENB of activity detector 224 is coupled to a second input terminal of AND gate 226. Clock input terminal C of arbiter 22 is coupled to respective clock input terminals C of priority encoder 222 and activity detector 224. The internally generated acknowledge signal ACK(A), supplied to bus A interface 30 (of FIG. 1), is coupled to an acknowledge input terminal ACK of activity detector 224.

In operation, priority encoder 222 processes the request signals from bus A interface 30 and bus B interface 40 (of FIG. 1). The request input terminal R1 of priority encoder 222 is the higher priority, and request input terminal R2 is the lower priority. Grant signals for bus A interface 30 and bus B interface 40 are produced at output terminals G1 and G2, respectively. Priority encoder 222 may be formed in a manner well known in the art and will not be discussed in detail here. Under normal operating conditions (block 102 of FIG. 2), the enable signal from the activity detector is a logic '1' signal. This conditions AND gate 226 to pass requests from bus B interface 40 through to the priority detector. So long as the enable signal is a logic '1' signal, the multiport memory will operate in a normal manner.

Activity detector 224 monitors the request signal R(A) received from and the grant G(A) and acknowledge ACK(A) signals supplied to bus A interface 30 to determine the volume of memory requests from bus A interface 30. If the volume of memory requests from bus A interface 30 rises above a first predetermined level, then activity detector assumes that the FIFOs in bus A interface 30 may be in danger of overflow or underflow, as described above. Under this condition, the enable signal to AND gate 226 is made a logic '0' signal. This prevents any request signal from bus B interface 40 from arriving at the priority encoder 222. So long a the enable signal is a logic '0' signal, no memory accesses will be granted to bus B interface 40. While in this mode of operation, activity detector 224 will enable AND gate 226 for one memory request after a predetermined number of successive requests from bus A interface 30. This mode of operation corresponds to block 106 of FIG. 2 indicating that the memory requests from bus B interface 30 are partially disabled.

While in this mode of operation, activity detector 224 continues to monitor the volume of memory requests from bus B interface 30. If activity detector 224 determines that the volume of requests from bus A interface 30 has dropped below a second predetermined level (possibly different from the first predetermined level), then the enable signal ENB is made a logic '1' signal, AND gate 226 will be reenabled and normal operation (block 102 of FIG. 2) will be resumed.

Figure 5:
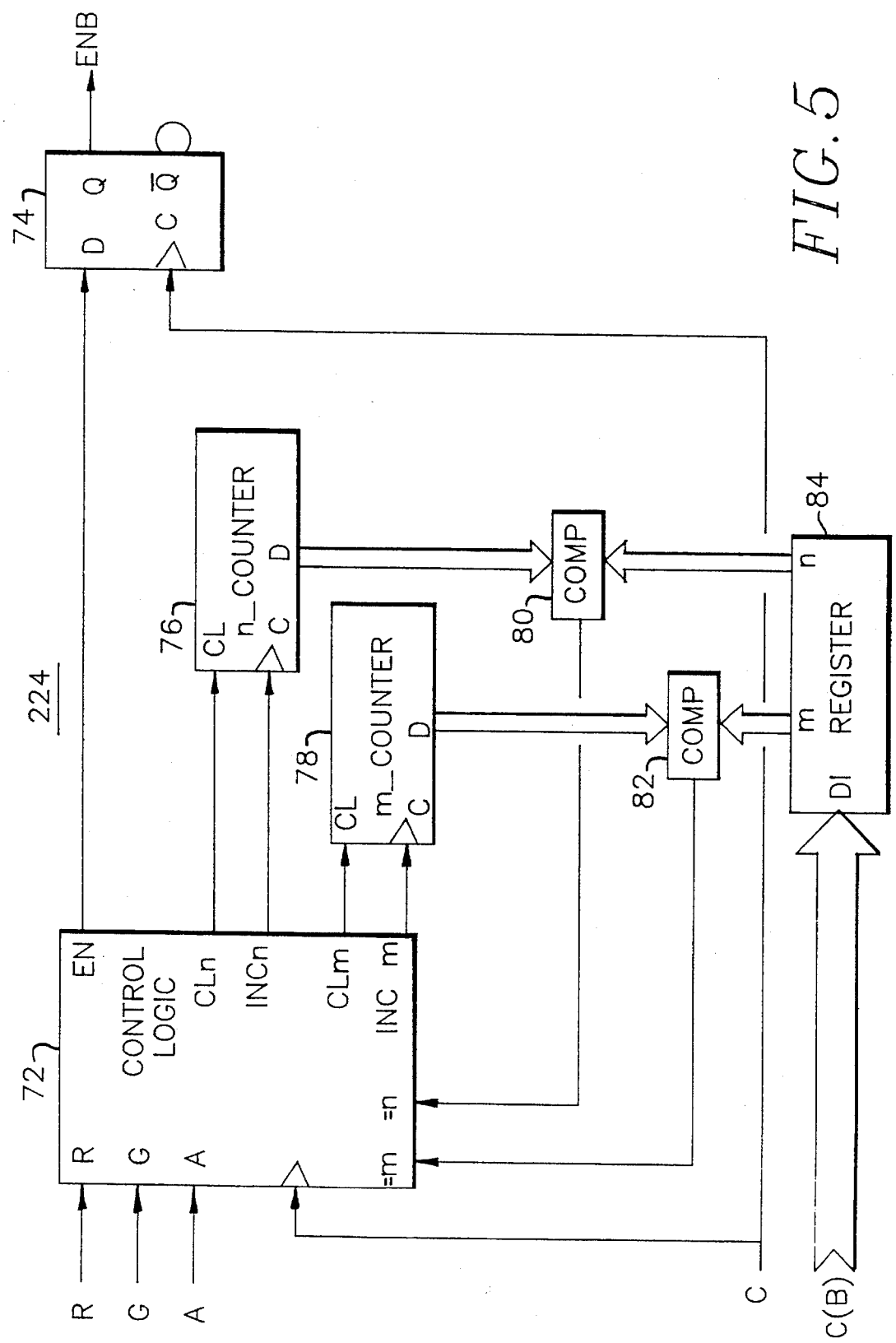
FIG. 5 is a more detailed block diagram of a portion of the arbiter illustrated in FIG. 4.

FIG. 5 is a more detailed block diagram of activity detector 224 illustrated in FIG. 4. In FIG. 5, the request input terminal R of activity detector 224 (of FIG. 4) is coupled to a request input terminal R of a control logic circuit 72; the grant input terminal G of activity detector 224 is coupled to a grant input terminal G of control logic circuit 72; and the acknowledge input terminal A of activity detector 224 is coupled to an acknowledge input terminal A of control logic circuit 72. The clock input terminal C of activity detector 224 is coupled to a clock input terminal C of control logic circuit 72 and a clock input terminal C of a D-type flip-flop 74. An enable output terminal EN of control logic circuit 72 is coupled to a D input terminal of flip-flop 74. A Q output terminal of flip-flop 74 is coupled to the enable output terminal ENB of activity detector 224.

A clear n_counter output terminal, CL-n, of control logic 72 is coupled to a clear input terminal CL of an n_counter 76, and an increment n_counter output terminal, INC-n, of control logic 72 is coupled to a clock input terminal C of n_counter 76. A data output terminal D of n_counter 76 is coupled to a first input terminal of a comparator (COMP) 80. An output terminal of comparator 80 is coupled to an =n input terminal of control logic 72.

A clear m_counter output terminal, CL-m, of control logic 72 is coupled to a clear input terminal CL of an m_counter 78, and 15 an increment m_counter output terminal, INC-m, of control logic 72 is coupled to a clock input terminal C of m_counter 78. A data output terminal D of m_counter 78 is coupled to a first input terminal of a comparator (COMP) 82. An output terminal of comparator 82 is coupled to an =m input terminal of control logic 72.

In FIG. 5, a control input terminal C(B) is coupled to the host computer bus (BUS B) through circuitry (not shown). The control input terminal C(B) may operate in a known manner as a part of a control/status (CS) link to the host computer. Such a control/status link allows for the transfer of control information from the host computer to peripheral equipment coupled to the host computer over the host computer bus. This control input terminal C(B) may be coupled directly to the host computer bus, or may be coupled through bus B interface 40. One skilled in the art will understand how to design, build and operate such a control/status link between the host computer and peripheral equipment.

The control input terminal C(B) is coupled to a data input terminal DI of a control/status register 84 (usually designated CSR). A first output terminal n of register 84 is coupled to a second input terminal of comparator 80, and a second output terminal m of register 84 is coupled to a second input terminal of comparator 82.

Figure 6:
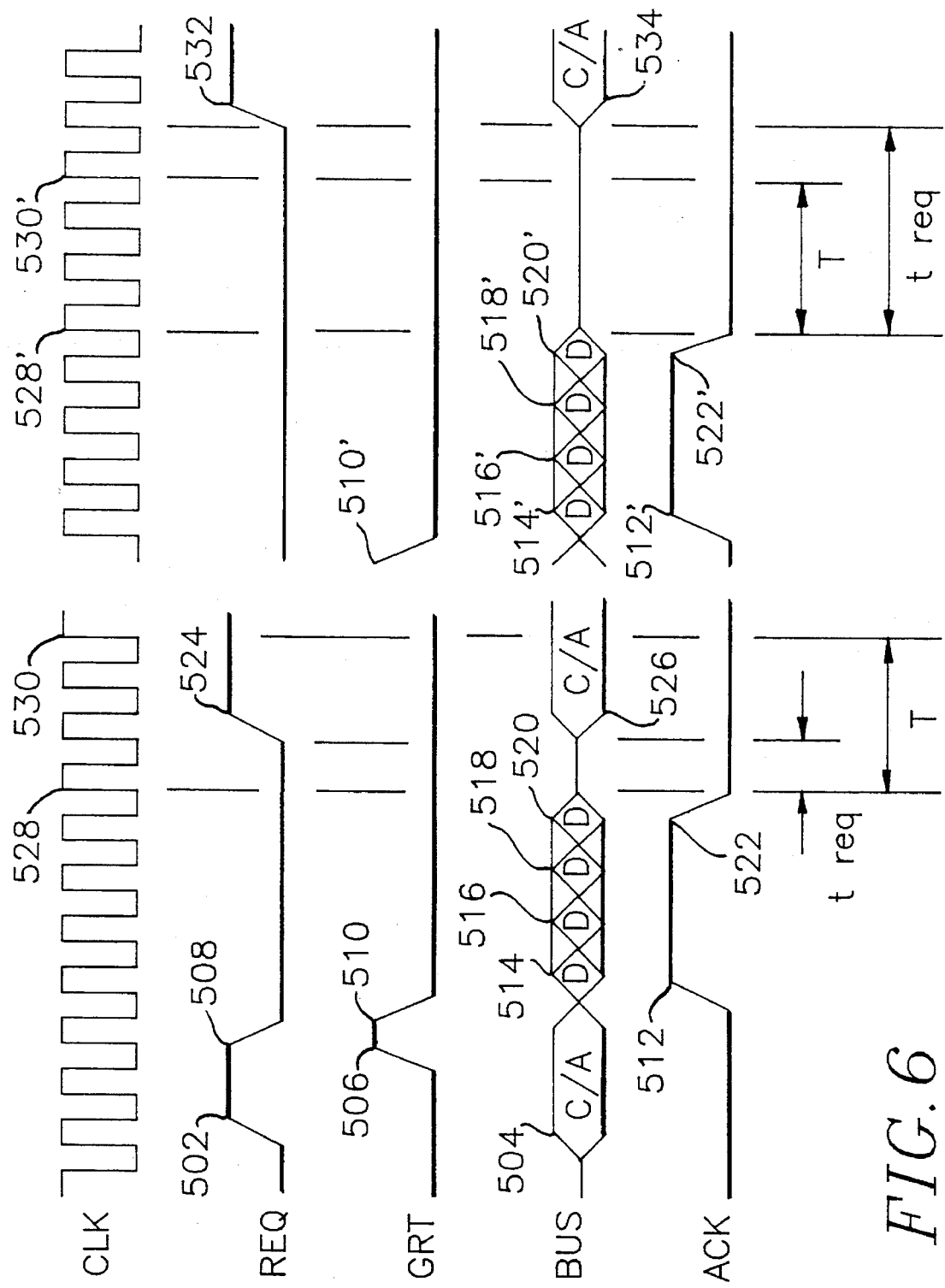
FIG. 6 is a waveform diagram of several signals of interest in the operation of the arbiter illustrated in FIG. 4.
Figure 7:
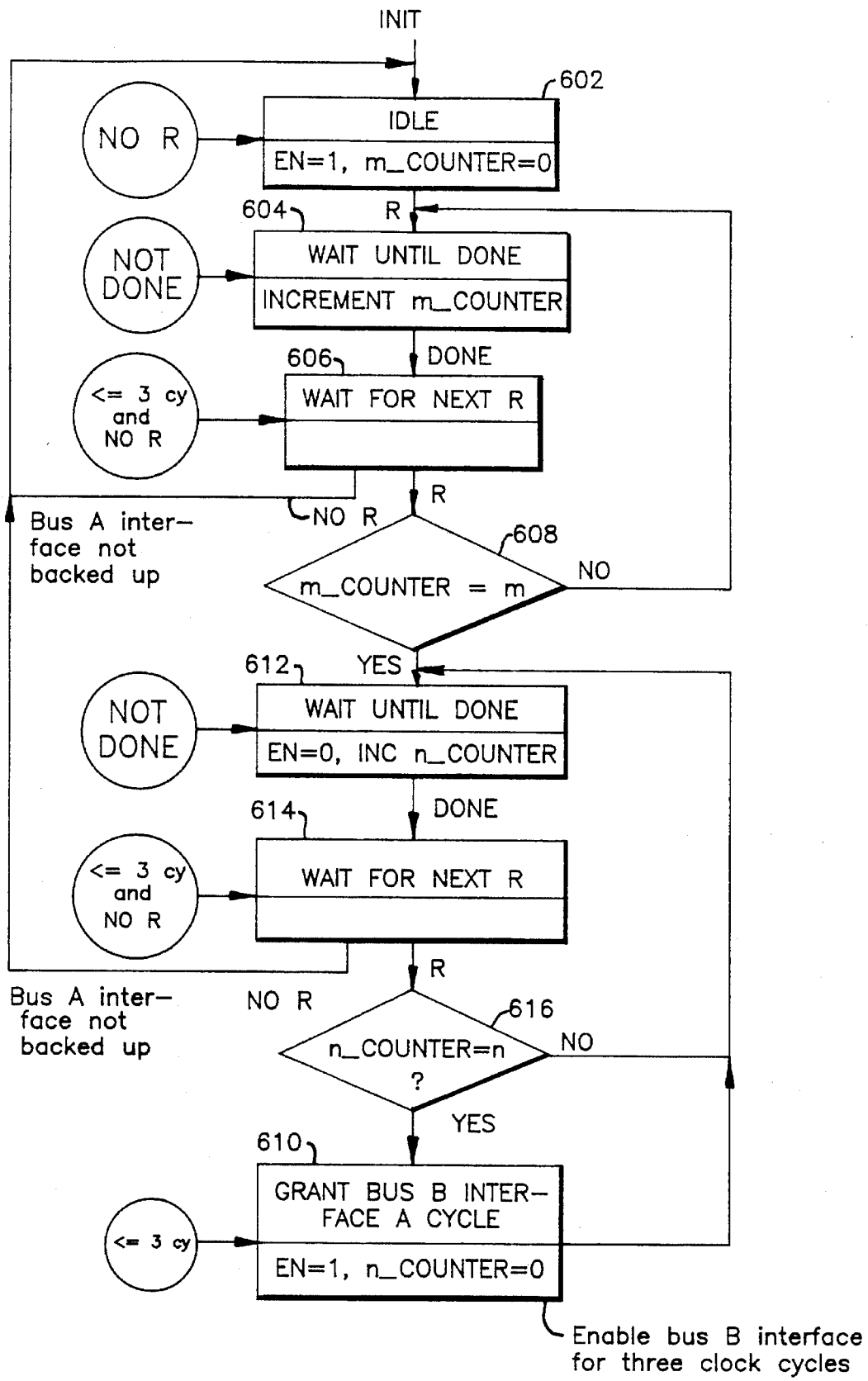
FIG. 7 is a more detailed flow chart illustrating the operation of the arbiter illustrated in FIG. 4.

The operation of the activity detector 224 illustrated in FIG. 5 may be more easily understood by reference to the waveform diagram illustrated in FIG. 6 and the flow chart illustrated in FIG. 7. The signals illustrated in FIG. 6 will be described as those associated with bus A interface 30, although the timing is the same as for signals associated with bus B interface 40, or any other memory port attached to memory 10 (of FIG. 1).

Because of the generic nature of the signals, they are designated with generic labels. The CLK signal corresponds to the C signal received from bus A interface 30 (of FIG. 1). The REQ signal corresponds to the R(A) signal received from bus A interface 30. The GRT signal corresponds to the G(A) signal produced by the memory controller 20. The BUS signal corresponds to the signal on the memory bus coupling memory interface port M of bus A interface 30 to the memory interface port M(A) of memory controller 20, and the ACK signal corresponds to the acknowledge signal ACK(A) produced by the memory controller 20.

The left hand side of FIG. 6 illustrates the timing of the illustrated signals in a complete memory transfer. The clock signal CLK is derived from and maintained in synchronism with the data on the network communications bus (BUS A), as described above. Transitions of most signals are made in synchronism with the clock, although, in general, it need not be so.

A memory transfer is initiated by bus A interface 30 (of FIG. 1) asserting the REQ signal (502). At the same time, the command and address information C/A is placed on the memory bus as illustrated on the BUS signal (504). The grant signal GRT is asserted (506) by priority encoder 222 (of FIG. 4) when bus A interface 30 is given access to memory bus 25 (of FIG. 3), and deasserted one clock period later (510). In response to the assertion of the grant signal GRT (506), bus A interface 30 deasserts the request signal REQ (508).

When memory controller 20 is ready to accept or provide the data associated with the memory access request, the acknowledge signal ACK is asserted (512). At the same time, the first 32 bits of data D to be exchanged is placed on the bus (514). In the case of a memory read, memory 10 places the data on the bus; in the case of a memory write, bus A interface 30 places the data on the bus. As discussed above, a complete memory transfer may consist of up to 8 successive memory exchanges. The number of exchanges to be made in this transfer is indicated in the command and address C/A information placed on the bus at the beginning of the memory transfer (504). For simplicity, only four such exchanges (514, 516, 518, 520) are illustrated in FIG. 6.

When the memory transfer is completed, i.e. when all the data exchanges are complete, the acknowledge signal ACK is deasserted (522). Another memory transfer in then initiated by the reassertion of the REQ signal (524) and the placing of the associated command and address information C/A on the bus (526). The period of time from the completion of the previous memory transfer, indicated by the deassertion of the ACK signal (522), to the initiation of the next memory transfer, indicated by the reassertion of the request signal REQ (524), is designated t-req.

In the illustrated embodiment, it is assumed that if a request from bus A interface 30 (of FIG. 1) is received within three clock periods of the completion of a previous memory transfer, then the FIFOs in bus A interface 30 have data waiting in them (in the case of the receive FIFO 32), or require data for transfer to the network communications bus (BUS A) (in the case of the transmit FIFO 34). This predetermined period of time T starts at the deassertion of the acknowledge signal ACK (522), corresponding to the leading edge (528) of the clock signal CLK, and ends three clock periods later (530). On the lefthand side of FIG. 6, the time t-req is less than the time T, indicating that one, or both, of the FIFOs in bus A interface 30 are backed up to some (as yet unknown) extent.

The righthand side of FIG. 6 illustrates the last portion of another memory transfer, including the deassertion of the GRT signal (510') the assertion of the acknowledge signal ACK (512'), the placement of the data to be exchanged on the bus (514', 516', 518', 520') and the deassertion of the acknowledge signal 522', indicating the completion of the memory transfer. Another request is initiated by the reassertion of the request signal REQ (532'). The predetermined period of time T starts with the leading edge of clock signal CLK corresponding to the completion of the memory transfer (528') and ends with the leading edge three cycles later (530'). In this case, however, the time period t-req (522' to 532) is larger than the predetermined period of time T (528' to 530'). This indicates that the FIFOs in bus A interface 30 are not backed up to any extent at all.

FIG. 7 is a more detailed flow chart of the method of operation illustrated in FIG. 2 for the activity detector 224 illustrated in FIG. 5. In FIG. 7, states which the control logic 72 of activity detector 224 can assume during its operation are illustrated as rectangular blocks. The upper portion of each state block is a label indicating the general nature of the state, and the lower portion of the block indicates actions, if any, which are taken within that block. Each block has a loop on the left side to indicate the condition under which the control logic 72 remains in that state. So long as that condition is met, the control logic 72 remains in that state. When that condition is no longer met, then the control logic 72 enters the next indicated state.

During initialization of the network interface, the host computer will write m and n values into the control/status register 84 in a known manner via the signals supplied to the control input terminal C(B) by the host computer (not shown). As described above, these values may be changed using the control/status link of the host computer.

Referring concurrently to FIGS. 5 and 7, after initialization, control logic 72 enters the idle state 602. In this state, control logic 72 generates a logic '1' signal on the EN output terminal. This signal, coupled to the D input terminal of flip-flop 74, will cause the ENB signal, supplied to AND gate 226 (of FIG. 4), to become a logic '1' signal at the next leading edge of the clock signal C. At the same time, control logic 72 generates a signal on the CL-m output terminal which conditions the m_counter 78 to reset to 0. Control logic 72 then begins to monitor the request signal R. So long as there is no request, control logic 72 remains in the idle state 602.

When a request is detected, control logic 72 enters state 604. When state 604 is entered, control logic 72 generates a signal on the INC-m output terminal which conditions the m_counter 78 to increment its count. The control logic 72 then begins to monitor the grant signal G and acknowledge signal A to determine when the current memory transfer is done. So long as the memory transfer is not done, control logic 72 remains in state 604.

When the memory transfer is done, control logic 72 enters state 606. In state 606, control logic 72 monitors the clock signal C and the request signal R. So long as three or fewer clock cycles have passed and no request signal has been detected, then control logic 72 remains in state 606. If three clock cycles pass without a request being detected, then control logic 72 reenters state 602. If a request is detected before three clock cycles pass, then control logic 72 enters state 608.

If control logic 72 enters state 608, comparator 82 compares the current count of the m_counter 78 to the current m value stored in the command/status register 84. If they are equal, then comparator 82 produces a logic '1' signal on its output terminal; otherwise comparator 82 produces a logic '0' on its output terminal. The output terminal of comparator 82 is coupled to the =m input terminal of control logic 72. In state 608, control logic 72 monitors the state of the signal on the =m input terminal and if it is a logic '0' signal, indicating that the count of the m_counter is not equal to m (i.e. it is less than m), then control logic 72 reenters state 604. If this signal is a logic '1' signal, indicating that the count of the m_counter is equal to m, then control logic enters state 612.

The combination of steps 602, 604, 606 and 608 count the number of consecutive times that a request from bus A interface 30 occurs within 3 clock cycles of the completion of the previous memory request while memory requests from bus B interface 40 are enabled. If the number of consecutive times exceeds the predetermined number m, then the FIFOs in bus A interface 30 are assumed to be significantly backed up. In response to this condition, the requests from bus A interface 40 are partially disabled as described below. In the preferred embodiment, the predetermined number of consecutive times (m) that a request from bus A interface 30 occurs within three clock cycles of the completion of the previous memory transfer, which is assumed to indicate that the FIFOs in bus A interface 30 are significantly backed up, is 15.

When control logic 72 enters state 612, a logic '0' signal is produced on EN output terminal, coupled to the D input terminal of flip-flop 74. This causes flip-flop 74 to produce a logic '0' signal at its Q output terminal at the next leading edge of the clock signal C. This, in turn, causes AND gate 226 (of FIG. 4) to block requests from bus B interface 40 to the priority encoder 222 effectively disabling memory requests from bus B interface 40. In addition, control logic 72 produces a signal at the INC-n output terminal which conditions n_counter 76 to increment its count. Then control logic 72 begins to monitor the grant input terminal G and the acknowledge input terminal A to determine when the pending memory transfer is done. Control logic 72 remains in state 612 until the memory transfer is done.

When the memory transfer is done, control logic 72 enters state 614. In this state, control logic 72 begins to monitor the request input terminal R and the clock input terminal C. So long as three or fewer clock cycles have passed and no request signal have been detected, control logic 72 remains in state 614. If three clock cycles pass without a request being detected, then control logic 72 reenters state 602. If a request is detected before three cycles of the clock have passed, then control logic 72 enters state 616.

Comparator 80 compares the current count of the n_counter 76 to the value of n stored in the command/status register 84. If they are equal, then comparator 80 produces a logic '1' signal at its output terminal; otherwise comparator 80 produces a logic '0' signal at its output terminal. The signal at the output terminal of comparator 80 is coupled to the =n input terminal of control logic 72. When in state 616, control logic 72 monitors the signal at the =n input terminal, and if it is a logic '1' signal, which indicates that the count of the n_counter is equal to n, then control logic enters state 610, which will allow three clock cycles for a pending request from bus B interface 40 to be granted by the priority encoder 222 (of FIG. 4). If the signal at the =n input terminal is a logic '0' signal, which indicates that the count of the n_counter is not equal to n (i.e. it is less than n), then control logic reenters state 612, which will allow the next request from bus A interface 30 to be granted.

When control logic 72 enters state 610, a logic '1' signal, again, is produced on the EN output terminal of control logic 72, which is coupled to the D input terminal of D flip-flop 74. This conditions flip-flop 74 to produce a logic '1' signal at its Q output terminal at the next leading edge of the clock signal C. This, in turn, enables AND gate 226 (of FIG. 4) to pass any pending requests from bus B interface 40 to the priority encoder 222. In addition, a signal is produced on the CL-n output terminal which conditions n_counter 76 to reset to 0. Control logic 72 then begins to monitor the clock signal C. Control logic 72 remains in state 610 for three clock cycles, then control logic 72 reenters state 612.

The combination of steps 612, 614, 616 and 610 count the number of consecutive times that a request from bus A interface 30 occurs within three clock cycles of the completion of the previous request while memory requests from bus B interface 40 are disabled. If the number of consecutive times exceeds the predetermined number n, then bus B interface 40 is enabled for three clock cycles. This allows a pending request to be granted, even though the FIFOs in bus A interface 30 are assumed to remain significantly backed. After the three clock cycles have been granted to bus B interface 40, the memory requests from bus B interface 40 are again disabled. In a preferred embodiment, the number of consecutive requests from bus A interface 30 which will be granted before a request, if pending, from bus B interface 40 will be granted is 256.

Each of the states which control logic 72 may enter may include further substates within them. Control logic 72 may be constructed as a state machine, or may be constructed as clocked combinatorial logic. One skilled in the art of logic design and construction will understand how to design and build control logic 72 to implement the method illustrated in FIG. 7.

What we claim is:

1. A method for arbitrating conflicting memory transfer requests in a multiport memory system including first and second memory ports, said method comprising the steps of:

monitoring a volume of memory transfer requests from said first memory port;

partially disabling said second memory port if said volume is greater than a first predetermined volume; and reenabling said second memory port when said volume of memory transfer requests becomes less than a second predetermined volume, said second predetermined volume being less than said first predetermined volume.

2. The method of claim 1, wherein said monitoring step comprises the steps of:

waiting for a predetermined period of time after completion of a memory transfer to detect subsequent memory transfer requests by said first memory port;

determining that said volume of memory transfer requests is less than said second predetermined volume if no subsequent memory transfer request is detected within said predetermined period of time;

counting consecutive said subsequent memory transfer requests by said first memory port detected within said predetermined period of time after completion of a preceding memory transfer; and determining that said volume of memory transfer requests exceeds said first predetermined volume, if the count exceeds a predetermined number m.

3. The method of claim 2, wherein said predetermined number m is changed under user control.

4. The method of claim 2, wherein said predetermined number m is 16.

5. The method of claim 2, wherein said partially disabling step comprises the steps of:

counting consecutive memory transfer requests granted to said first memory port; and granting one memory transfer request to said second memory port if the memory transfer requests granted to said first memory port exceed a predetermined number n.

6. The method of claim 5, wherein said predetermined number n is changed under user control.

7. The method of claim 5, wherein said predetermined number n equals 256.

8. The method of claim 1, wherein said partially disabling step comprises the steps of:

counting consecutive memory transfer requests granted to said first memory port; and granting one memory transfer request to said second memory port if the memory transfer requests granted to said first memory port exceed a predetermined number n.

9. The method of claim 8, wherein said predetermined number n is changed under user control.

10. The method of claim 8, wherein said predetermined number n equals 256.

11. Apparatus for arbitrating conflicting memory transfer requests in a multiport memory system including first and second memory ports, said apparatus comprising:

means for monitoring a volume of memory transfer requests from said first memory port;

means for partially disabling said second memory port if said volume is greater than a first predetermined volume; and means for reenabling said second memory port when said volume of memory transfer requests becomes less than a second predetermined volume, said second predetermined volume being less than said first predetermined volume.

12. The apparatus of claim 11, wherein said means for monitoring comprises:

means for waiting for a predetermined period of time after said completion of a memory transfer to detect subsequent memory transfer requests by said first memory port;

means for determining that said volume of memory transfer requests is less than said second predetermined volume if no subsequent memory transfer request is detected within said predetermined period of time;

means for counting consecutive said subsequent memory transfer requests by said first memory port detected within said predetermined period of time after completion of a preceding memory transfer; and means for determining that said volume of memory transfer requests exceeds said first predetermined volume, if the count exceeds a predetermined number m.

13. The apparatus of claim 12, further including means for changing said predetermined number m under user control.

14. The apparatus of claim 12, wherein said predetermined number m is 16.

15. The apparatus of claim 12, wherein said means for partially disabling comprises:

means for counting consecutive memory transfer requests granted to said first memory port; and means for granting one memory transfer request to said second memory port if the memory transfer requests granted to said first memory port exceed a predetermined number n.

16. The apparatus of claim 15, further including means for changing said predetermined number n under user control.

17. The apparatus of claim 15, wherein said predetermined number n equals 256.

18. The apparatus of claim 11, wherein said means for partially disabling comprises:

means for counting consecutive memory transfer requests granted to said first memory port; and means for granting one memory transfer request to said second memory port if the memory transfer requests granted to said first memory port exceeds a predetermined number n.

19. The apparatus of claim 18, further including means for changing said predetermined number n under user control.

20. The apparatus of claim 18, wherein said predetermined number n equals 256.

21. Apparatus for arbitrating conflicting requests for a memory transfer in a multiport memory system including first and second memory ports, each generating respective memory transfer requests, said apparatus comprising:

an activity detector, coupled to said first memory port, to generate a bistate signal having a first state when a volume of memory requests from said first memory port exceeds a first predetermined volume and a second state when the volume of memory requests from said first memory port drops below a second predetermined volume, said second predetermined volume being less than said first predetermined volume; and means for partially disabling memory requests from said second memory port in response to said bistate signal being in said first state.

22. The apparatus of claim 21, wherein said means for partially disabling comprises a gate having a first input terminal responsive to said memory transfer requests from said second memory port, a second input terminal responsive to said bistate signal, and an output terminal for transmitting memory transfer requests from said second memory port when said bistate signal is in said second state and for not transmitting memory transfer requests from said second memory port when said bistate signal is in said first state.

23. The apparatus of claim 22 wherein said gate is an AND gate.

24. The apparatus of claim 21, wherein said activity detector comprises:

means for generating a first signal when a memory transfer request signal from said first memory port is detected within a predetermined period of time from completion of a previous memory transfer and for generating a second signal when said predetermined period of time expires without said memory transfer request signal from said first memory port being detected;

means for counting consecutive first signals, and for resetting a count to zero in response to said second signal;

means for comparing the count to a predetermined number m and producing a third signal when said count is equal to said predetermined number m; and means for generating said bistate signal in said first state in response to said third signal.

25. The apparatus of claim 24, wherein said counting means is a counter having a clock input terminal responsive to said first signal, a clear input terminal responsive to said second signal and a data output terminal for producing a count representative signal; and said comparing means is a comparator having a data input terminal responsive to said count representative signal, and an output terminal for producing said third signal when said count representative signal is equal to said predetermined number m.

26. The apparatus of claim 24, wherein said activity detector further includes a register, responsive to user control and having an output terminal coupled to said comparing means, for storing said predetermined number m.

27. The apparatus of claim 21, wherein said activity detector comprises:

means for generating a first signal when a memory transfer request signal from said first memory port is detected within a predetermined period of time from completion of a previous memory transfer;

means for generating a second signal when said bistate signal changes from said second state to said first state;

means for counting a number of consecutive first signals, and for resetting a count to zero in response to said second signal;

means for comparing the count to a predetermined number n and producing a third signal when said count is equal to said predetermined number n; and means, responsive to said third signal, for generating said bistate signal in said second state for a second predetermined period of time sufficient to grant a memory transfer request from said second memory port, then generating said bistate signal in said first state.

28. The apparatus of claim 27, wherein said counting means is a counter having a clock input terminal responsive to said first signal, a clear input terminal responsive to said second signal and a data output terminal for producing a count representative signal; and said comparing means is a comparator having a data input terminal responsive to said count representative signal, and an output terminal for producing said third signal when said count representative signal is equal to said predetermined number n.

29. The apparatus of claim 27, wherein said activity detector further includes a register, responsive to user control and having an output terminal coupled to said comparing means, for storing said predetermined number n.

30. The apparatus of claim 27 wherein said means for comparing is a first comparing means and said activity detector further comprises:

means for generating a fourth signal when said memory transfer request signal from said first memory port is detected within said predetermined period of time from the completion of the previous memory transfer;

means for generating a fifth signal when said predetermined period of time from the completion of the previous memory transfer expires without said memory transfer request signal from said first memory port being detected;

second means for counting consecutive fourth signals, and for resetting the count of said second counting means to zero in response to said fifth signal;

second means for comparing the count of said second counting means to a second predetermined number m and producing a sixth signal when said count of said second counting means is equal to said second predetermined number m; and means for generating said bistate signal in said first state in response to said sixth signal.

31. The apparatus of claim 30, wherein:

said second counting means is a counter having a clock input terminal responsive to said fourth signal, a clear input terminal responsive to said fifth signal and a data output terminal for producing a second count representative signal; and said second comparing means is a comparator having a data input terminal responsive to said second count representative signal, and an output terminal for producing said sixth signal when said second count representative signal is equal to said second predetermined number m.

32. The apparatus of claim 30, wherein said activity detector further includes a register, responsive to user control and having an output terminal coupled to said second comparing means, for storing said second predetermined number m.

33. The apparatus of claim 32, wherein said register further includes a second output terminal coupled to said first comparing means, for storing said predetermined number n.

* * * * *